Patented Feb. 15, 1949

2,461,531

UNITED STATES PATENT OFFICE 2,461,531

COLOR STABILIZATION OF VINYL HALIDE RESINS

Fred W. Cox, Cuyahoga Falls, and James M. Wallace, Jr., Akron, Ohio, assignors to Wingfoot Corporation, Akron, Ohio, a corporation of Delaware No Drawing. Application June 15, 1945, Serial No. 599,770

9 Claims. (Cl. 260—78.5)

This invention relates to the stabilization of vinyl halide resins, and particularly the vinyl halide resins which are polymers of at least 70 percent of vinyl halide, including the polymers of 100 percent vinyl halide and the copolymers of vinyl halides with other polymerizable mono-olefinic compounds.

Vinyl halide resins generally will discolor when heated, for example at a temperature of 100° C. or higher, and especially in the presence of iron or iron salts. It has been discovered that the addition of a small proportion of antimony alkali metal tartrate to the resin composition will enable the resin to resist the discoloration effect for substantial periods of time.

The vinyl halide resins which may be stabilized in accordance with this invention include the polyvinyl halides, made by the polymerization of any compound of the group consisting of vinyl chloride, vinyl bromide, vinyl fluoride and vinyl iodide without the presence of other polymerizable mono-olefinic compounds. The invention is also useful in the prevention of discoloration upon heating in copolymers of from 70 to 100 percent of a vinyl halide with from 0 to 30 percent of another polymerizable mono-olefinic compound. Although any polymerizable mono-olefinic compound which is compatible with the vinyl halide in polymeric form, that is, which forms copolymers therewith, may be stabilized, the invention is particularly useful in the treatment of copolymers of monomeric mixtures of vinyl halide and up to 30 percent of vinyl acetate, vinylidene chloride, styrene, the alkyl fumarates, the alkyl maleates, the alkyl chloromaleates, the alkyl chlorofumarates, the alkyl acrylates or the alpha substituted alkyl acrylates. The copolymers which are of particular importance are those of 70 to 98 percent of vinyl halide and from 2 to 30 percent of said other mono-olefinic monomer. A preferred class of copolymers are those of 80 to 95 percent of vinyl halide and from 5 to 20 percent of the other monomer.

The stabilization against discoloration upon heating is effected by the addition of antimony alkali metal tartrates. Although any member of this class of compounds is useful, for obvious economic reasons the antimony potassium tartrate and the antimony sodium tartrate are preferred. The quantity of stabilizer used will depend upon the severity of the heating to which the vinyl resin is to be subjected. Even traces of the agent will yield an improved product which will be useful where only mild heating is to be encountered. Although from 0.05 to 10 percent by weight, based on the polymer content of the resin, will produce useful compositions, generally it is desirable to use from 0.5 to 5 percent of the alkali metal tartrate.

The stabilizing agent may be incorporated by any of several methods. It may be added to the solid resin and mixed therein by means of a roll mill or other mixing machine adapted to blend solid plastic materials. The mixing machine may be heated during the mixing operation to render the compositions more plastic. Alternatively, the stabilizing agent may be dissolved in any suitable solvent, and the solution then mixed with the resin. The vinyl halide resin may be dissolved in a solvent, such as ethylene dichloride, and the stabilizing agent added to the solution and dispersed therein by means of any stirring device. If the polymers or copolymers are prepared by polymerization in an aqueous emulsion, the stabilizing agent may be added and distributed through the polymer prior to coagulation. Any other method which permits a uniform distribution of the stabilizing agent throughout the polymer may be used.

The stabilized resins may be used in the preparation of cast films or in the fabrication of molded or extruded shapes, which uses are well known to the art. The stabilized vinyl halide resins are particularly useful in the preparation of transparent or light colored articles in which discoloration upon heating is undesirable.

Further details of the invention are set forth with respect to the following specific example.

Example

Each of three 10 gram samples of a copolymer of 90 percent vinyl chloride and 10 percent diethyl fumarate were milled with 2 ml. of dibutyl sebacate. Two of these samples were milled with 0.2 gram of antimony potassium tartrate and with 0.2 gram of antimony tartrate respectively. The third sample was used as a control for the purpose of comparison. The copolymer samples were milled separately on a laboratory-size chromium-plated roll mill for 5 minutes at 140° F., and then for 5 minutes at 212° F. The coplymers were finally rolled into sheets 1 mm. in thickness. Specimens were cut from each of the three sheets and were tested by heating at 135° C. for periods of time varying between ½ hour and 4 hours. It was found that the copolymer containing antimony potassium tartrate was unaffected by the temperature of 135° C. throughout the four hour period, while the control copolymer and the copolymer containing antimony tartrate were both discolored by the heat to about the same extent.

This application is a continuation-in-part of application Serial No. 502,311, filed September 14, 1943 now abandoned.

Although the invention has been described with respect to a specific example, it is not intended that the details thereof shall be construed as limitations upon the scope of the invention except to the extent incorporated in the following claims.

We claim:

1. A vinyl halide resin capable of resisting discoloration upon heating which comprises a polymer of from 70 to 100 percent of vinyl halide and from up to 30 percent of mono-olefinic compound copolymerizable with vinyl halide, said polymer containing from 0.05 to 10 percent by weight based on the polymer content of the resin of an antimony alkali metal tartrate.

2. A vinyl chloride resin capable of resisting discoloration upon heating which comprises a copolymer of 70 to 98 percent of vinyl chloride and from 2 to 30 percent of mono-olefinic compound copolymerizable with vinyl chloride, said resin containing from 0.05 to 10 percent by weight based on the copolymer of antimony potassium tartrate.

3. A vinyl chloride resin capable of resisting discoloration upon heating which comprises a copolymer of 70 to 98 percent of vinyl chloride and from 2 to 30 percent of dialkyl fumarate, said resin containing from 0.05 to 10 percent by weight based on the copolymer of antimony potassium tartrate.

4. A vinyl chloride resin capable of resisting discoloration upon heating which comprises a copolymer of 70 to 98 percent of vinyl chloride and from 2 to 30 percent of dialkyl maleate, said resin containing from 0.05 to 10 percent by weight based on the copolymer of antimony potassium tartrate.

5. A vinyl chloride resin capable of resisting discoloration upon heating which comprises a copolymer of 70 to 98 percent of vinyl chloride and from 2 to 30 percent of dialkyl chloromaleate, said resin containing from 0.05 to 10 percent by weight based on the copolymer, of antimony potassium tartrate.

6. A vinyl halide resin capable of resisting discoloration upon heating which comprises a polymer of from 70 to 100 percent of vinyl halide and from up to 30 percent of mono-olefinic compound copolymerizable with vinyl halide, said polymer containing from 0.5 to 5 percent by weight based on the polymer content of the resin, of an antimony alkali metal tartrate.

7. A vinyl chloride resin capable of resisting discoloration upon heating which comprises a copolymer of 80 to 95 percent vinyl chloride and 5 to 20 percent of dialkyl fumarate, said resin containing from 0.5 to 5 percent by weight based on the copolymer of antimony potassium tartrate.

8. A vinyl chloride resin capable of resisting discoloration upon heating which comprises a copolymer of 80 to 95 percent vinyl chloride and 5 to 20 percent of dialkyl maleate, said resin containing from 0.5 to 5 percent by weight based on the copolymer, of antimony potassium tartrate.

9. A vinyl chloride resin capable of resisting discoloration upon heating which comprises a copolymer of 80 to 95 percent vinyl chloride and 5 to 20 percent of dialkyl chloromaleate, said resin containing from 0.5 to 5 percent by weight based on the copolymer, of antimony potassium tartrate.

FRED W. COX.
JAMES M. WALLACE, Jr.

No references cited.